(12) United States Patent
Cordell et al.

(10) Patent No.: US 8,559,618 B1
(45) Date of Patent: Oct. 15, 2013

(54) CONTACT CENTER CALL ROUTING BY AGENT ATTRIBUTE

(75) Inventors: Jeffrey William Cordell, Omaha, NE (US); James K Boutcher, Omaha, NE (US); Michelle L Steinbeck, Omaha, NE (US)

(73) Assignee: West Corporation, Omaha, NE (US)

( * ) Notice: Subject to any disclaimer, the term of this patent is extended or adjusted under 35 U.S.C. 154(b) by 1989 days.

(21) Appl. No.: 11/427,014

(22) Filed: Jun. 28, 2006

(51) Int. Cl.
*H04M 3/00* (2006.01)
*H04M 5/00* (2006.01)

(52) U.S. Cl.
USPC ............ 379/265.12; 379/265.02; 379/265.05; 379/265.07; 704/256

(58) Field of Classification Search
USPC .............. 379/266.01, 88.01, 265.02–265.12; 704/256
See application file for complete search history.

(56) References Cited

U.S. PATENT DOCUMENTS

| | | | | |
|---|---|---|---|---|
| 4,918,322 | A * | 4/1990 | Winter et al. | 379/67.1 |
| 6,396,919 | B1 * | 5/2002 | Shimada et al. | 379/265.12 |
| 6,546,087 | B2 * | 4/2003 | Shaffer et al. | 379/90.01 |
| 6,988,126 | B2 * | 1/2006 | Wilcock et al. | 709/204 |
| 2002/0046030 | A1 * | 4/2002 | Haritsa et al. | 704/256 |
| 2003/0115064 | A1 * | 6/2003 | Gusler et al. | 704/270 |
| 2004/0096050 | A1 * | 5/2004 | Das et al. | 379/265.12 |
| 2005/0286705 | A1 * | 12/2005 | Contolini et al. | 379/265.02 |
| 2007/0250318 | A1 * | 10/2007 | Waserblat et al. | 704/236 |

* cited by examiner

*Primary Examiner* — Quynh Nguyen

(57) ABSTRACT

A system, method, and computer readable medium for contact center call routing by agent attribute, that comprises, detecting a caller voice attribute, sampling at least one agent voice attribute, storing the at least one agent voice attribute, matching the detected caller voice attribute to the stored voice attribute of the at least one agent, and routing a call based upon the matched agent voice attribute to the detected caller voice attribute.

19 Claims, 5 Drawing Sheets

CONTACT CENTER CALL ROUTING BY AGENT ATTRIBUTE

CROSS REFERENCE TO RELATED APPLICATIONS

The present patent application is related to commonly assigned U.S. patent application Ser. No. 11/427,013 entitled REMOTELY MONITORING CALL CENTER STATISTICS, and U.S. patent application Ser. No. 11/427,010 entitled SESSION INITIATION PROTOCOL ENABLED AGENT DESKTOP ENVIRONMENT, and U.S. patent application Ser. No. 11/427,009 entitled SCRIPT LOGIC GRAPHICAL MAPPING, and U.S. patent application Ser. No. 11/427,008 entitled SCRIPT LOGIC VIEWING, and U.S. patent application Ser. No. 11/427,007 entitled REAL TIME FEEDBACK OF SCRIPT LOGIC filed on even date herewith, the entire contents of which are incorporated by reference herein.

BACKGROUND OF THE INVENTION

The present invention is generally related to the contact center call routing strategies, more specifically, to contact center call routing by agent attribute such as regional dialect.

A contact center is a group trained agents or technicians that are required to use a telephone and computer to perform their duties. Integration of voice (telephone) and data (PC) create an agents desktop environment. A trend in contact center technology is the growing use of virtual contact centers. This is based on the principle of employing contact center agents for the completion of contact center duties from their home or other remote location such as working in general local office suites also referred to as hotel workers. Virtual contact center agents require reliable network interconnectivity to include a Public Switched Telephone Network (PSTN) and Internet Protocol (IP) networks. The contact center provider must provide or publish the services and tools to perform: agent authentication, encryption (secure data during transport), and relevant $3^{rd}$ party application interfaces to complete the contact center agent duties. Clients employ contact center providers to perform their customer contact duties. Customers are those individuals that use some form of communication (telephone, email, instant message and fax as examples).

To increase call center customer satisfaction, agents must have accurate timely information and must respond quickly. This timely and accurate response by the agent is enabled by continuous flow of information to and from the agent in the form of a script. The script allows the agent to handle objections, answer questions and gather information in an efficient process. The script as a whole is comprised of individual panels which have instructions, information and data queries. This set of panel instructions, information and data queries are referred to as panel logic. The panels themselves are tied together depending upon the questions asked and information required, this panel to panel linkage is referred to as branching logic and can tie a large variety of panels together in a dynamic fashion as the need arises. Panels tied together by branching logic form a script path. The information contained in the scripts requires a constant stream of data to and from the contact center; this data stream needs to have a high quality of service to in order to adequately service the customer.

Observations have been made during the practice of voice talent training to help operators in the south be more articulate during conference calls. The southern accent was inherent to the area was not trained out of the agents and was viewed by many customer's as helpful and friendly. Therefore what is needed is to route customer contact calls based on similar agent attributes. More specifically, what is needed is a method of contact center call routing by agent voice attribute.

SUMMARY OF THE INVENTION

Virtual contact centers environments are hosted in internetworked environments. Individual environments may host several thousands of contact center agents. A large pool of potentially thousands of virtual contact center agents presents a diverse group of characteristics that may present an opportunity for improved up-sell and/or customer service opportunities. A customer's accent or regional dialect may be detected by an automated speech recognition function and routed to a virtual contact center agent of like accent/dialect to provide a sense of a neighborhood or local support interface for the client. Another routing algorithm may capitalize on a virtual contact center agent's profile such as product experience, hobbies, sex. It has been observed that customers of a specific region preferred the technical representative from that region due to apparently similar accents and feeling of being local and familiar to the customer business. A similar observation was made during the practice of voice talent training to help operators in the south be more articulate during conference calls. The southern accent was inherent to the area was not trained out of the agents and was viewed by many customer's as helpful and friendly. Therefore what is needed is to route customer contact calls based on similar agent attributes. More specifically, what is needed is a method of contact center call routing by agent attribute such as regional dialect.

In one embodiment of the present invention, a contact center call routing by agent attribute comprises, detecting a caller voice attribute, sampling at least one agent voice attribute, storing the at least one agent voice attribute, matching the detected caller voice attribute to the stored voice attribute of the at least one agent, and routing a call based upon the matched agent voice attribute to the detected caller voice attribute. The method may comprise surveying characteristics of at least one agent, creating a database containing the sampled voice attribute and the surveyed characteristics of the at least one agent, assessing a caller characteristic and wherein the voice attribute is a regional dialect, the voice attribute is a gender, the agent characteristic is a product experience, the agent characteristic is a hobby, the agent characteristic is a gender and the agent characteristic is matched to the caller characteristic.

In a further embodiment of the present invention comprises instructions for, sampling voice attributes of at least one agent, surveying characteristics of the at least one agent, creating a database containing the sampled voice attribute and the surveyed characteristics of the at least one agent, detecting a caller voice attribute, assessing a caller characteristic, matching at least one of, the detected caller voice attribute to the stored voice attribute of the at least one agent upon, and the caller characteristic to the agent characteristic and routing a call based upon the match. Wherein the voice attribute is a regional dialect, the voice attribute is a gender, the agent characteristic is a product experience, the agent characteristic is a hobby and the agent characteristic is a gender.

In yet a further embodiment, a system for contact center call routing by agent attribute, that comprises, a processor, wherein the processor detects a caller voice attribute, samples at least one agent voice attribute, matches the detected caller voice attribute to the stored voice attribute of the at least one agent and routes a call based upon the matched agent voice attribute to the detected caller voice attribute, and a memory communicably coupled to the processor, wherein the memory stores the at least one agent voice attribute. The system processor may also survey characteristics of the at least one agent, and assess a caller characteristic, wherein the voice attribute is a regional dialect and the voice attribute is a gender.

DETAILED DESCRIPTION OF THE INVENTION

Figure 1:
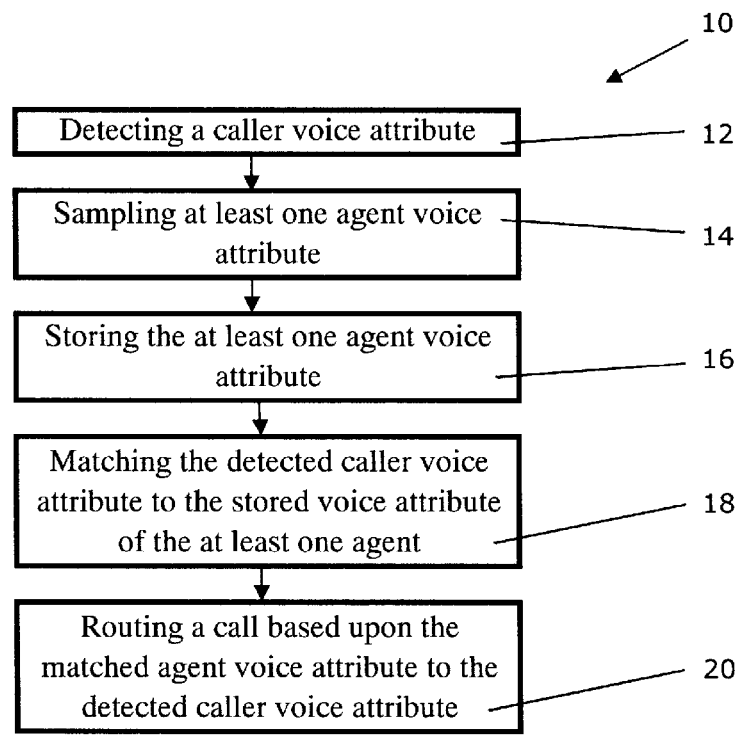
FIG. 1 depicts a first method of contact center call routing by agent attribute in accordance with a preferred embodiment of the present invention.

Referring now to FIG. 1, a first method of contact center call routing by agent attribute 10 is depicted. A method for contact center call routing by agent attribute, that comprises, detecting 12 a caller voice attribute, sampling 14 at least one agent voice attribute, storing 16 the at least one agent voice attribute, matching 18 the detected caller voice attribute to the stored voice attribute of the at least one agent, and routing 20 a call based upon the matched agent voice attribute to the detected caller voice attribute. The method is performed by software, hardware, firmware, and/or the combination of software, hardware, and/or firmware.

Figure 2:
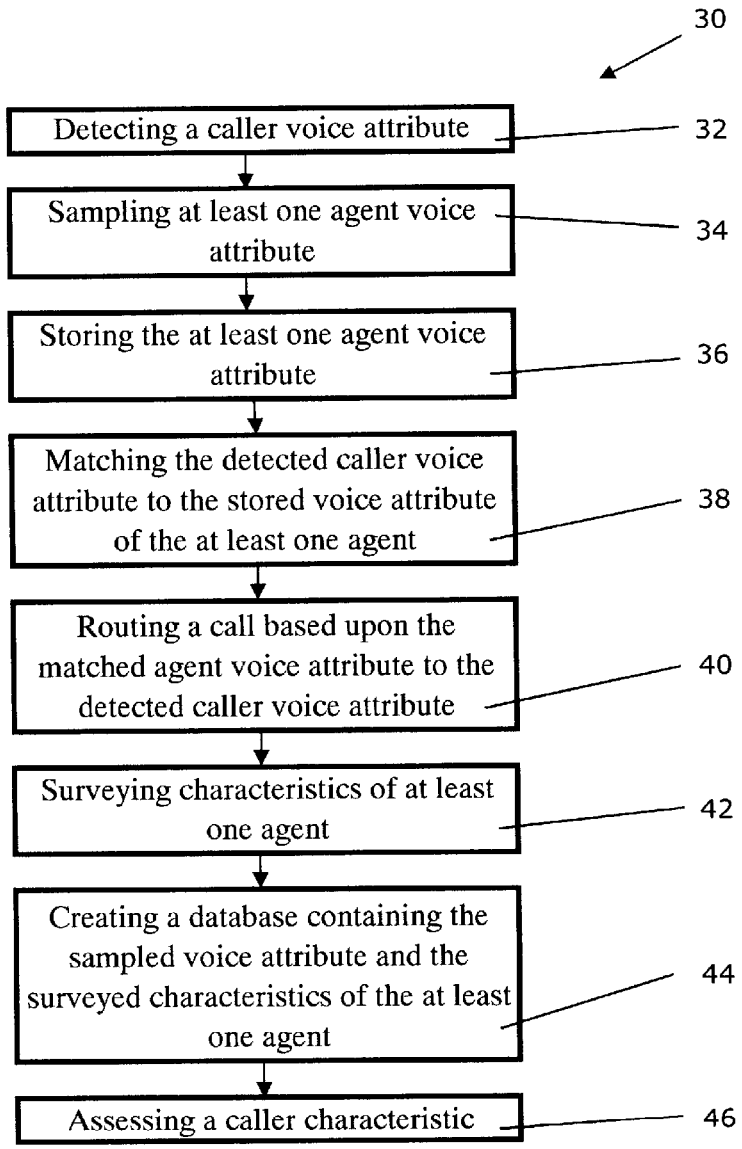
FIG. 2 depicts a second method of contact center call routing by agent attribute in accordance with a preferred embodiment of the present invention.

Referring now to FIG. 2, a second method of contact center call routing by agent attribute 30 is depicted. A method for contact center call routing by agent attribute, that comprises, detecting 32 a caller voice attribute, sampling 34 at least one agent voice attribute, storing 36 the at least one agent voice attribute, matching 38 the detected caller voice attribute to the stored voice attribute of the at least one agent, and routing 40 a call based upon the matched agent voice attribute to the detected caller voice attribute. The method may also include surveying 42 characteristics of at least one agent, creating 44 a database containing the sampled voice attribute and the surveyed characteristics of the at least one agent and assessing 46 a caller characteristic and wherein the voice attribute is a regional dialect, the voice attribute is a gender, the agent characteristic is a product experience, the agent characteristic is a hobby, the agent characteristic is a gender and the agent characteristic is matched to the caller characteristic. The method is performed by software, hardware, firmware, and/or the combination of software, hardware, and/or firmware.

Figure 3:
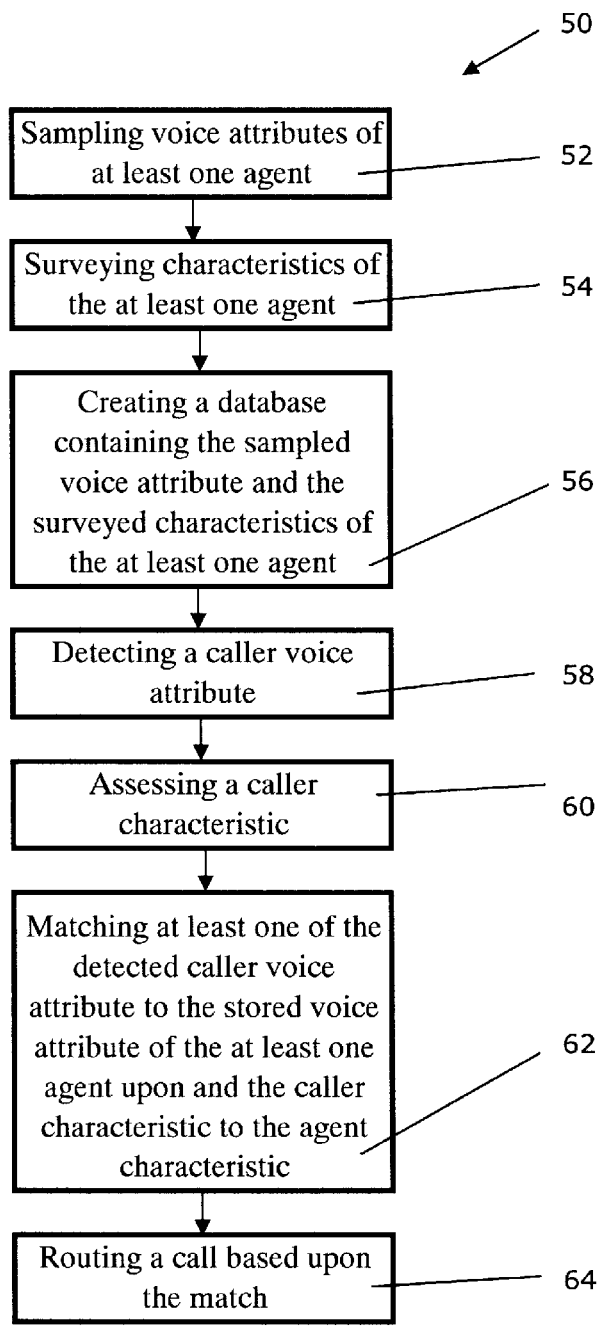
FIG. 3 depicts a first software flow block of contact center call routing by agent attribute in accordance with a preferred embodiment of the present invention.

Referring now to FIG. 3, a first software flow block of contact center call routing by agent attribute 50 is depicted. A computer readable medium that comprises instructions for, sampling 52 voice attributes of at least one agent, surveying 54 characteristics of the at least one agent, creating 56 a database containing the sampled voice attribute and the surveyed characteristics of the at least one agent, detecting 58 a caller voice attribute, assessing 60 a caller characteristic, matching 62 at least one of, the detected caller voice attribute to the stored voice attribute of the at least one agent upon, and the caller characteristic to the agent characteristic, and routing 64 a call based upon the match. This method is preferably embodied in a computer readable medium or software but may also be embodied in firmware and is utilized via hardware. The transfer of information between the repository and the monitor occurs via at least one of a wireless protocol, a wired protocol and the combination of the wireless protocol and the wired protocol. The steps performed in this figure are performed by software, hardware, firmware, and/or the combination of software, hardware, and/or firmware.

Figure 4:
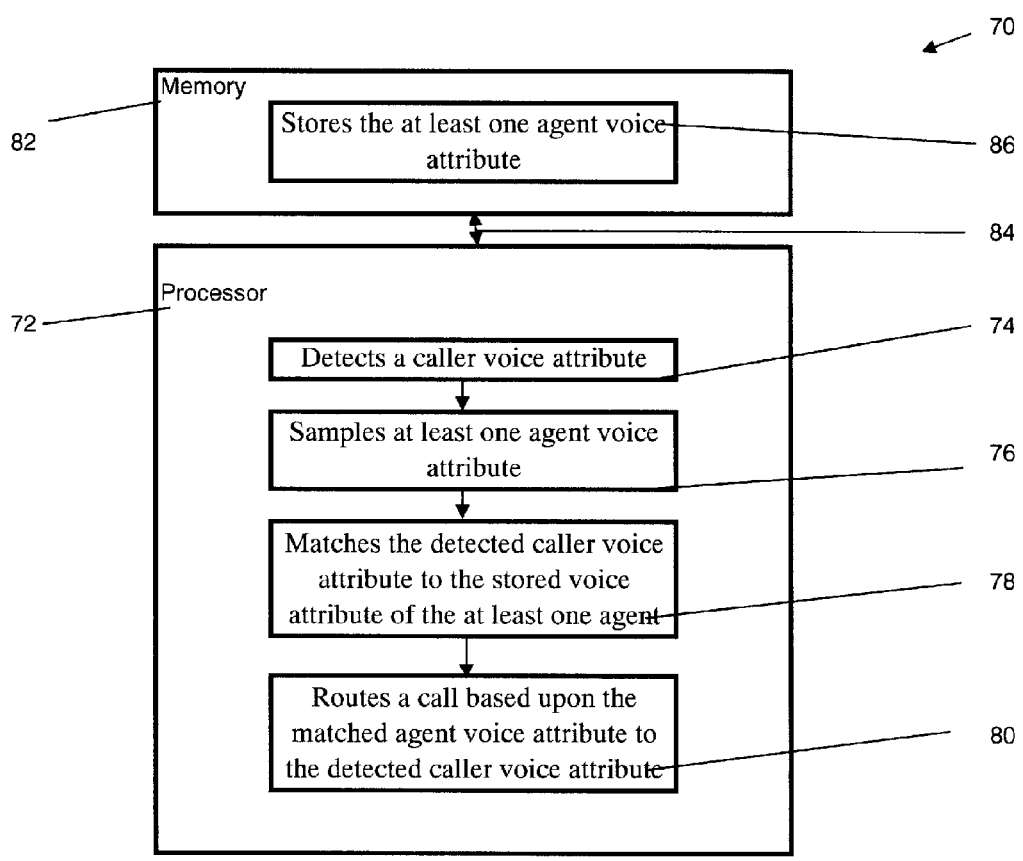
FIG. 4 depicts a first system of contact center call routing by agent attribute in accordance with a preferred embodiment of the present invention.

Referring now to FIG. 4, a first system of contact center call routing by agent attribute 70 is depicted. A system for contact center call routing by agent attribute, that comprises, a processor 72, wherein the processor detects 74 a caller voice attribute, samples 76 at least one agent voice attribute, matches 78 the detected caller voice attribute to the stored voice attribute of the at least one agent and routes 80 a call based upon the matched agent voice attribute to the detected caller voice attribute, and a memory 82 communicably coupled 84 to the processor, wherein the memory stores 86 the at least one agent voice attribute. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 5:
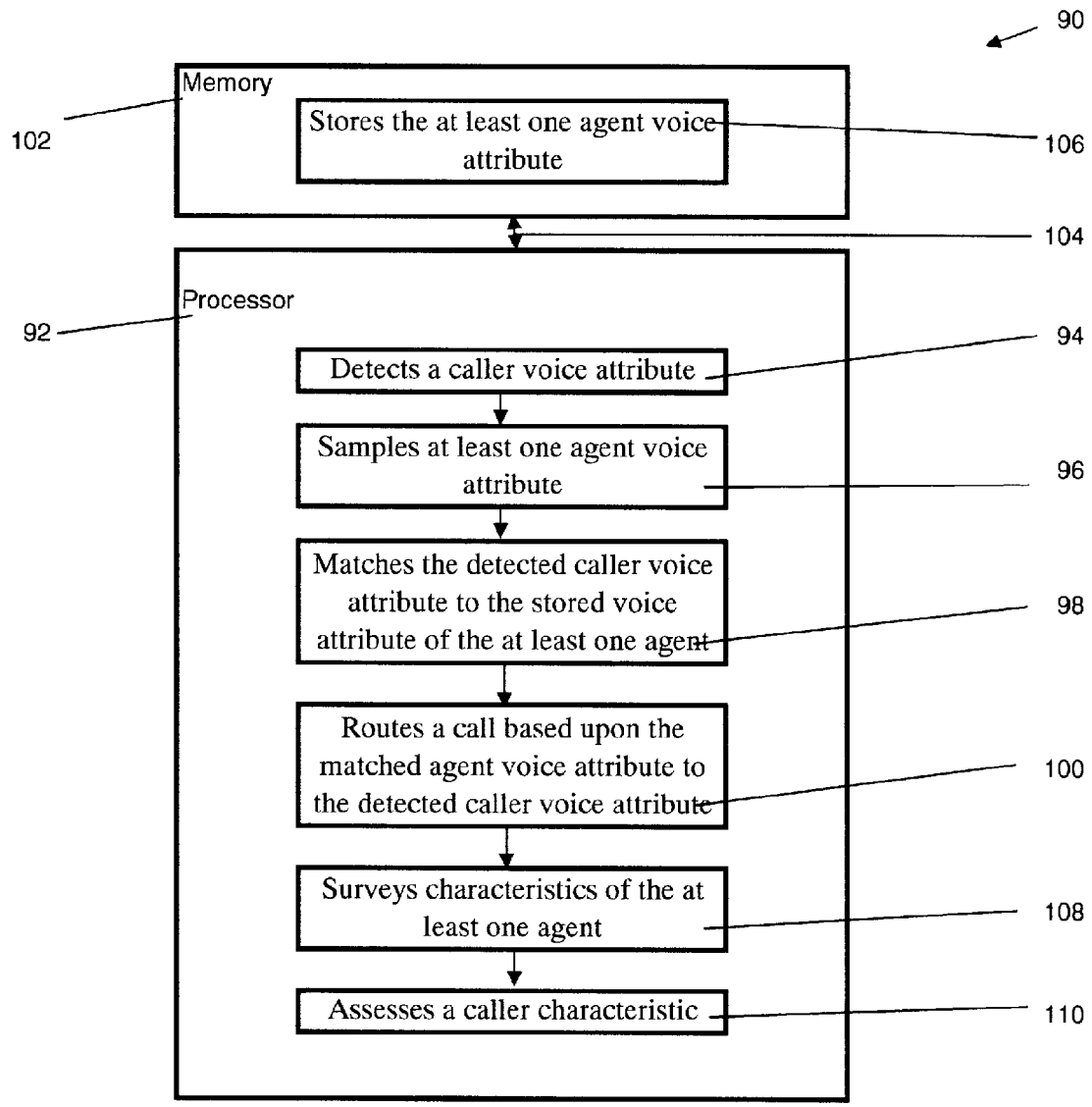
FIG. 5 depicts a second system of contact center call routing by agent attribute in accordance with a preferred embodiment of the present invention.

Referring now to FIG. 5, a second system of contact center call routing by agent attribute 90 is depicted. A system for contact center call routing by agent attribute, that comprises, a processor 92, wherein the processor detects 94 a caller voice attribute, samples 96 at least one agent voice attribute, matches 98 the detected caller voice attribute to the stored voice attribute of the at least one agent and routes 100 a call based upon the matched agent voice attribute to the detected caller voice attribute, and a memory 102 communicably coupled 104 to the processor, wherein the memory stores 106 the at least one agent voice attribute. The system processor may also survey 108 characteristics of the at least one agent, and assess 110 a caller characteristic, wherein the voice attribute is a regional dialect and the voice attribute is a gender. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive broadband signals. Further, the present invention can be utilized by non-virtual contact center agents and by mobile agents utilizing wireless technologies to receive and provide information. Still further, although depicted in a particular manner, various modules or blocks may be repositioned without departing from the scope of the current invention. Still further, although depicted in a particular manner, a greater or lesser number of processors, memories and internet protocol inter-network connections can be utilized with the present invention in order to accomplish the present invention, to provide additional known features to the present invention, and/or to make the present invention more efficient.

What is claimed is:

1. A method for contact center call routing by agent attribute, comprising:
   detecting a caller voice attribute by an automated speech recognition function;
   sampling at least one agent voice attribute;
   storing the at least one agent voice attribute;
   assessing a caller characteristic;
   matching the detected caller voice attribute to the stored voice attribute of the at least one agent and matching the caller characteristic to a surveyed characteristic of the at least one agent; and
   routing a call based upon the matched agent voice attribute to the detected caller voice attribute and based upon the matched caller characteristic to the surveyed characteristic of the at least one agent.

2. The method of claim 1 wherein,
   the voice attribute is a regional dialect.

3. The method of claim 1 wherein,
   the voice attribute is a gender.

4. The method of claim 1 comprising:
   surveying characteristics of at least one agent.

5. The method of claim 1 comprising:
   creating a database containing the sampled voice attribute.

6. The method of claim 4 wherein,
   the agent characteristic is a product experience.

7. The method of claim 4 wherein,
   the agent characteristic is a hobby.

8. The method of claim 4 wherein,
   the agent characteristic is a gender.

9. The method of claim 1, wherein at least one routing algorithm is used to route calls.

10. A non-transitory computer readable storage medium comprising instructions that when executed by a processor, cause the processor to perform:
    sampling voice attributes of at least one agent by an automated speech recognition function;
    surveying characteristics of the at least one agent;
    creating a database containing the sampled voice attribute and the surveyed characteristics of the at least one agent;
    detecting a caller voice attribute;
    assessing a caller characteristic;
    matching:
       the detected caller voice attribute to the stored voice attribute of the at least one agent and matching
       the caller characteristic to a surveyed agent characteristic; and
    routing a call based upon the matchings.

11. The non-transitory computer readable storage medium of claim 10 wherein,
    the voice attribute is a regional dialect.

12. The non-transitory computer readable storage medium of claim 10 wherein,
    the voice attribute is a gender.

13. The non-transitory computer readable storage medium of claim 10 wherein,
    the agent characteristic is a product experience.

14. The non-transitory computer readable storage medium of claim 10 wherein,
    the agent characteristic is a hobby.

15. The non-transitory computer readable storage medium of claim 10 wherein,
    the agent characteristic is a gender.

16. A system for contact center call routing by agent attribute, comprising:
    a processor, wherein the processor detects a caller voice attribute, samples at least one agent voice attribute, matches the detected caller voice attribute to the stored voice attribute of the at least one agent, matches an assessed caller characteristic to surveyed characteristics of the at least one agent, and routes a call based upon the matched agent voice attribute to the detected caller voice attribute and the matched caller characteristic and agent characteristic; and
    a memory communicably coupled to the processor, wherein the memory stores the at least one agent voice attribute.

17. The system of claim 16 wherein
    the processor assesses a caller characteristic.

18. The system of claim 17 wherein,
    the voice attribute is a regional dialect.

19. The system of claim 17 wherein,
    the voice attribute is a gender.

* * * * *